Feb. 2, 1965 R. B. GELENIUS 3,168,689
ELECTRICAL GAUGE
Filed May 8, 1962

INVENTOR.
Robert B. Gelenius
BY
Paul J. Ethington
ATTORNEY

United States Patent Office 3,168,689
Patented Feb. 2, 1965

3,168,689
ELECTRICAL GAUGE
Robert B. Gelenius, Flint, Mich., assignor to General Motors Corporation, Detroit, Mich., a corporation of Delaware
Filed May 8, 1962, Ser. No. 193,145
7 Claims. (Cl. 318—23)

This invention relates to gauges for indicating conditions at a remote point. More particularly, the invention relates to an indicator circuit of the type employing electromagnetic deflecting coils and novel means for effecting a distribution of current through the deflecting coils such that the resultant electromagnetic field is angularly displaced in proportion to the changing conditions to be indicated.

There are presently known a great variety of electromagnetic indicator circuits employing deflecting coils. In general, the deflecting coils are differentially energized in response to the movement of a potentiometer wiper. Such differential energization is effective to rotate the resultant electromagnetic field produced by the coils, such that a magnetized armature will be aligned therewith. The magnetized armature is rotatably mounted in magnetic proximity to the deflecting coils and is attached to an indicator needle, which is angularly displaced over a calibrated dial face to indicate changing conditions, such as the level of liquid in a tank. Indicators of this general variety may employ any number of deflecting coils and may operate on a principle of continuous angular displacement of the resultant electromagnetic field in response to changing positions of the sender unit which comprises the aforementioned potentiometer.

It is the general object of this invention to provide a novel electrical indicator circuit for angularly displacing an indicator needle in response to variations in remote conditions as are represented by the output of a signal voltage source. Briefly stated, the invention comprises a plurality of electromagnetic deflecting coils which are individually interconnected with a signal source of variable potential by means of a plurality of voltage responsive switching means. The switching means are sensitive to the magnitude of the voltage from the signal source to distribute the energizing current produced thereby among the plurality of deflecting coils such that the resultant electromagnetic field produced by the coils is angularly displaced by an amount dependent upon the magnitude of the signal voltage.

In a preferred embodiment of the invention, separate pairs of deflecting coils are coaxially wound to produce respective electromagnetic fluxes in opposite directions when energized. The respective pairs are then disposed such that the magnetic axes thereof intersect at predetermined angles. The coils are again interconnected with a variable magnitude signal source by means of the voltage responsive switching means such that individual coils in the pairs are energized according to a predetermined program. In order to establish a zero or reference electromagnetic field axis, a reference source is interconnected with one of the deflecting coils by means of signal voltage responsive switching means such that the bias source is disconnected from the indicator circuit at a predetermined magnitude of signal voltage.

The general operation of the inventive indicator circuit, as well as the objectives and advantages thereof, will be more readily understood upon reference to the following specification taken with the accompanying drawings of which:

Figure 1:
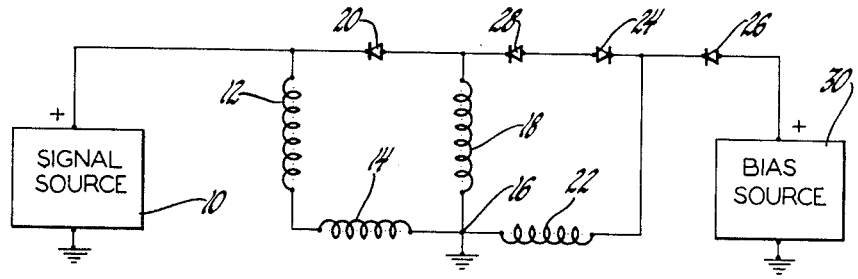
FIGURE 1 is a schematic circuit diagram of a preferred embodiment of the invention.

Referring now to FIGURE 1, the invention is shown embodied in an indicator circuit which provides up to 270° of indicator needle travel. This figure may be taken to represent an application of the invention to an electrical tachometer for indicating engine speed in revolutions per minute. The circuit comprises a signal source 10 which may be a tachometer generator capable of producing a D.C. voltage proportional to engine speed. The source 10 may, of course, be taken to represent any other form of signal voltage generator, the output of which is indicative of conditions at a remote point. For example, a suitable potentiometer arrangement may be employed. The signal source 10 has the negative terminal thereof connected to ground as shown, and the positive terminal connected directly to deflecting coils 12 and 14, which are connected in series. Coil 14 is also connected to a ground point 16 as shown in the drawings, such that the series combination of coils 12 and 14 is effectively connected across the source 10. A third deflecting coil 18 has one side thereof interconnected with the positive terminal of the signal source 10 by means of a Zener diode 20. The diode 20 is connected so as to be normally non-conductive to the signal from source 10 but has a predetermined reverse breakdown voltage, after which the voltage drop across the diode 20 remains constant with increasing current flow. The coil 18 has the other side connected to the ground point 16 as shown. A fourth deflecting coil 22 is connected on one side to the ground point 16. The other side is connected commonly to the cathode terminals of diodes 24 and 26. The anode terminal of diode 24 is connected to the anode terminal of a second Zener diode 28. The cathode terminal of Zener diode 28 is then connected through Zener diode 29 to the positive terminal of the signal source 10. It can be seen that diode 28 is normally open-circuited or non-conductive to the signal from source 10 but has a predetermined reverse breakdown voltage, after which the voltage drop across the diode 28 is constant with increasing current therethrough. Conduction of diode 28 is naturally dependent upon the prior breakdown of diode 29 due to the series connection.

Coil 22 is also connected through diode 26 to the positive terminal of a bias source 30, which may, for example, be an automobile battery. The negative terminal of the bias source 30 is connected to the common ground as shown. Diode 26 is connected so as to be normally conductive to the signal from the bias source 30 but adapted to be rendered non-conductive upon application of a voltage signal to the cathode thereof, which is equal to or greater than the magnitude of the signal from the bias source 30.

It should be noted that in the particular embodiment of FIGURE 1, all of the coils 12, 14, 18 and 22 have the same number of turns and the same D.C. resistance. Briefly considering the operation of the circuit shown in FIGURE 1, it can be seen that coils 12 and 14 are effectively connected across the signal source 10 and will always be conductive to current produced as a result of a voltage from the signal source 10. Since the Zener diode 20 normally presents an open circuit to the signal from the source 10, the signal will be prevented from reaching coils 18 or 22. As long as diode 26 is not reverse biased, it will be conductive to allow the voltage from bias source 30 to be directly applied across coil 22. It can be seen that diode 24 will prevent the signal from the bias source 30 from being conducted to coils 18, 12 or 14.

At a first predetermined magnitude of the signal from source 10, the Zener diode 20 will break down and allow conduction of the signal to coil 18. With diode 20 conductive in the reverse direction, coil 18 will be connected in parallel across the series combination of coils 12 and 14. Zener diode 28 will then continue to be non-conductive to the signal from source 10 until a second predetermined signal magnitude is reached, at which the reverse break-down voltage of diode 28 is exceeded. At this time the voltage from the signal source 10 will be applied to coil 22. At the same time, the application of the signal voltage source signal to the cathode of diode 26 will disconnect the bias source 30 from the circuit. With diodes 20 and 28 conductive, the coil 22 will be placed in a parallel connection with the previously existing parallel configuration of coils 18, 12 and 14.

Figure 2:
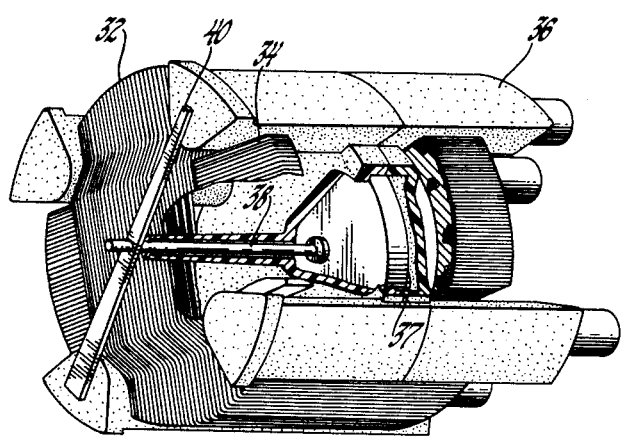
FIGURE 2 is a partially broken away isometric view of a means for properly disposing the deflecting coils of the circuit of FIGURE 1.

Before continuing with a detailed description of the effects of the switching action of the FIGURE 1 circuit, a consideration of a preferred coil arrangement will be made. Referring to FIGURE 2 there is shown an arrangement of the deflecting coils 12, 14, 18 and 22 in an air core gauge. Coils 12 and 18 of FIGURE 1 are wound bifilar in a single winding 32 such that the respective fluxes produced thereby lie in opposite directions along the axis of winding 32. Coils 14 and 22 are similarly wound bifilar to form winding 34. The fluxes produced by coils 14 and 22 also extend in opposite directions along the axis of winding 34. The windings 32 and 34 are wound on a gauge body 36 with the alternate layers of the windings interlaced as shown. This winding method contributes to more uniform coil parameters and gauge characteristics. Windings 32 and 34 are mutually perpendicular with the axes thereof intersecting at a point in the center of the windings. Located centrally of the windings 32 and 34 is a permanent magnet armature 37 in the form of a flat round disc which is diametrically magnetized. The plane of the armature 37 lies in the plane of the axes of the windings 32 and 34. Thus, the armature 37 is within the joint influence of the fields produced by windings 32 and 34. The armature 37 is rotatably mounted on a shaft 38 which extends through the center of the armature 37 and is perpendicular thereto. The shaft 38 is then mutually perpendicular to the axes of the windings 32 and 34. Mounted on the external end of the shaft 38 is an indicator needle 40, the angular disposition of which is indicative of the magnetic field relation between the windings 32 and 34.

Each of the windings 32 and 34 may produce, according to the value of current through the respective coils comprising the winding, a magnetic flux field in either direction along its magnetic axis. Accordingly, if the currents through the two coils making up either of the windings are equal, the magnetic fields, being in opposition, will cancel. By suitably relating the switching times of the Zener diodes 20 and 28 to the magnitude of the signal from source 10, the resultant flux field produced by the windings 32 and 34 may be made to vary in direction along the plane which is defined by the axes of the windings 32 and 34. The magnetic armature 37 will be aligned according to the known principle of magnetic attraction with the resultant field. Rotation of the armature 37 thus carries the needle 40 through an angular displacement corresponding to the angular displacement of the resultant flux field.

It is to be understood that the present invention is not limited to the winding configuration shown in FIGURE 2 but can be adapted to a configuration which suits the particular gauge structure. Similarly, the invention is equally suited to iron core gauges as will be apparent to one skilled in the art.

Figure 3:
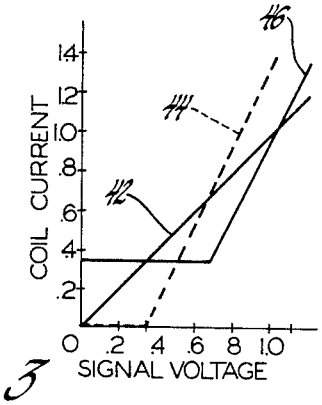
FIGURE 3 is a plot of the individual deflecting coil currents against the signal voltage magnitude.

Referring now to FIGURE 3, the variation in current through the respective coils is plotted against the variation in the signal voltage from source 10. Plot 42 is indicative of the linear relationship between the current through coils 12 and 14 and the signal voltage. The slope of the plot 42 will be determined by the sum of the resistances of coils 12 and 14.

Plot 44 indicates the current variations through coil 18 as a result of changing signal voltage. It can be seen that the current does not flow through the coil 18 until the signal voltage reaches a predetermined percentage, which percentage is sufficient to break down the Zener diode 20 shown in FIGURE 1. After the diode 20 has broken down, the current through coil 18 increases linearly with increasing signal voltage. Note that the rate of increase of current through coil 18 is greater than the rate of increase of current through the series connected coils 12 and 14 due to the difference in resistance.

Plot 46 shows the variations in the current through coil 22 with increasing signal voltage. The horizontal portion of plot 46 indicates the constant current which flows through coil 22 as a result of the connection through diode 26 to the bias source 30. The abrupt discontinuity in plot 46 indicates the point at which diode 28 breaks down to disconnect coil 22 from the bias source 30 and connects coil 22 to the signal source 10. After diode 28 breaks down, the current through coil 22 will increase linearly at the same rate as the current through coil 18 since the resistances thereof are equal.

Figure 4:
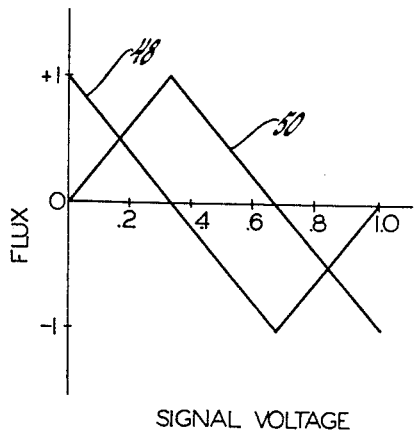
FIGURE 4 is a plot of the intensity and direction of the electromagnetic flux fields produced by the coaxial pairs of deflecting coils as employed in the preferred embodiment against the magnitude of the signal voltage.

FIGURE 4 is illustrative of the manner in which the electromagnetic fields along the axes of windings 32 and 34 of FIGURE 2 change in magnitude and direction with increasing signal voltage from source 10. Plot 48 may be taken to illustrate the field existing along the magnetic axis of winding 34 which comprises coils 14 and 22. It may be seen that the field initially exists in one direction with a magnitude which is arbitrarily assigned a value of $+1$ due to the connection of coil 22 with the bias source 30. Plot 50 illustrates the field magnitude and direction existing along the magnetic axis of winding 32 which comprises coils 12 and 18. Note that when the output of the signal source is zero such that no current flows through coils 12 and 18, the field accordingly is zero.

Figure 5:
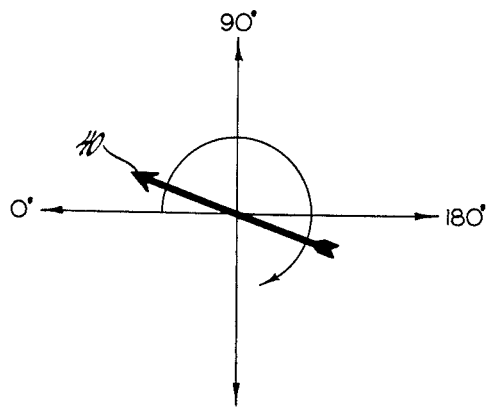
FIGURE 5 is a flux field vector diagram which is useful in determining the direction of the resultant electromagnetic field produced by the subject circuit.

FIGURE 5 illustrates how the vectors representing the flux fields produced by the four deflecting coils of FIGURE 1 extend outwardly from a common point corresponding to the center of windings 32 and 34 of FIGURE 2. Each of the field axes is separated from the adjacent axes by 90° and lies in a plane common to all axes. The indicator needle 40 of FIGURE 2 is superimposed on the vector diagram of FIGURE 5 to illustrate how the position of the needle 40 changes with the changing conditions within the flux field plane. The zero axis of FIGURE 5 is established by the coil 22. The 90° axis is established by coil 12 and the 180° and 270° axes are established by coils 14 and 18 respectively.

With the bifilar arrangement of coils as specified in FIGURE 2, the difference in current flowing through the individual coils of the bifilar pairs consisting of coils 12 and 18, and coils 14 and 22 will establish the direction of the field component along the horizontal or 0–180 degree axis and the vertical or 90–270 degree axis.

Considering the operation of the circuit of FIGURE 1 in greater detail, a sequence of references will be taken to FIGURES 3, 4 and 5. The first condition to be discussed is a condition of zero output from the signal source 10. At this time reference to plots 42 and 44 of FIGURE 3 indicates that no current is flowing through coils 12, 14 or 18. Plot 46, however, indicates that current is flowing through coil 22 from the bias source 30. The current through coil 22 produces a flux field of a $+1$ value as indicated by plot 48 of FIGURE 4. This flux field exists in the zero direction along the horizontal axis of FIGURE 5. The magnetic armature 37 of FIGURE 2 will be aligned with the field existing along the zero axis to align the indicator needle 40 therewith. Thus, when the system is employed as a tachometer indicator, the zero output from source 10 corresponds with zero revolutions of the engine.

As the signal voltage from the source 10 begins to increase, the current through coils 12 and 14 will increase linearly as shown in plot 42 of FIGURE 3. Up to a first predetermined signal voltage magnitude, as indicated by the discontinuity in plot 44 of FIGURE 3, the current through coil 18 remains zero. Current through coil 22 also remains constant at this point. The increasing current through coil 14 tends to create a field in opposition to that produced by coil 22. Thus, a field component will exist along the 180° axis of FIGURE 5 which subtracts from the field along the zero axis produced by coil 22. At the same time, current flow through coil 12 tends to create a field component along the 90° axis. This is illustrated in FIGURE 4 by the decreasing value of plot 48 and the increasing value of plot 50. The indicator needle 40 will tend to align with the resultant electromagnetic field which will exist between the zero and 90° axes.

With increasing signal voltage, the current through coils 12 and 14 continues to increase until the field produced by coil 14 is equal in magnitude and opposite in direction to the field produced by coil 22. At this time, plot 42 of FIGURE 3 crosses plot 46 indicating equal currents through coils 14 and 22. The flux produced along the horizontal axis of FIGURE 5 will be zero as indicated by the crossing of plot 48 of the zero axis in FIGURE 4. Since no current as yet flows through coil 18, there will be only one component of the electromagnetic field existing along the 90° axis. The indicator needle will be aligned therewith.

A further increase in the voltage from the signal source 10 exceeds the reverse breakdown voltage of the Zener diode 20 and the current begins to flow through coil 18. Current through coil 14 now exceeds the current through coil 22 and plot 48 of FIGURE 4 begins to increase negatively. The corresponding condition in FIGURE 5 is an increase in the field along the 180° axis due to increasing current through coil 14. With coil 18 now activated, current also flows therethrough to create a field component along the 270° axis. Since the current through coil 18 increases faster than the current through the series combination of coils 12 and 14, as indicated by the difference in slopes between plots 42 and 44 of FIGURE 3, the field along the 270° axis quickly becomes equal and opposite to the 90° field component. The resultant field exists along the 180° axis tending to align the indicator needle 40 therewith.

As the engine speed progresses, the magnitude of the signal from source 10 continues to increase until the reverse breakdown voltage of diode 28 is exceeded. At this time the current through coil 22, which has up until now been constant, begins to increase as shown in plot 46 of FIGURE 3. Diode 26 is now biased such that source 30 is disconnected from the circuit. Plot 48 of FIGURE 4 indicates that the increased current through coil 22 increases more rapidly than the current through the opposing coil 14 such that the net result is a positive increase in the field component in the 180° direction along the horizontal axis of FIGURE 5. The maximum gauge reading is achieved when the current through coil 22 is equal to the current through coil 14. This condition obtains when plot 42 of FIGURE 3 crosses plot 46 for the second time. Referring to FIGURE 4, plot 48 is returned to the reference line indicating that the total field component along the horizontal axis of FIGURE 5 is zero. At the same time, the current through coil 18 is in excess of that through the opposing coil 12 and the 270° field component is the predominant influence.

While the invention has been illustrated and described with reference to a particular embodiment thereof to produce 270° of indicator needle travel, it is to be understood that the invention is not so limited and is intended to embrace various modifications as will be apparent to one skilled in the art.

For a definition of the invention, reference should be had to the appended claims.

What is claimed is:

1. An electrical indicator circuit for angularly displacing an indicator needle in response to variations in the magnitude of a signal voltage source comprising, a plurality of coils having the magnetic axes thereof lying substantially in a single plane and separated by predetermined angles, a D.C. signal voltage source the output of which varies in accordance with a predetermined stimulus, a plurality of signal voltage responsive switching means, individual switching means interconnecting individual coils with the signal voltage source, the switching means being normally open circuited to the signal voltage but individually responsive to predetermined magnitudes thereof to close to apply the signal voltage to the coils thereby to produce a plurality of electromagnetic fields along the magnetic axes related in number and magnitude to the magnitude of the signal voltage, and rotatably mounted magnetic means responsive to the plurality of electromagnetic fields to be maintained in alignment with the resultant thereof, the indicator needle being connected to the magnetic means and rotatable therewith.

2. An electrical indicator for angularly displacing an indicator needle in response to magnitude variations in the output of a direct signal voltage source, the indicator comprising, a D.C. signal voltage source the output of which varies in accordance with a predetermined stimulus, a plurality of deflecting coils having the magnetic axes thereof mutually intersecting and separated by predetermined angles, each of the coils being connected on one end to one terminal of the source, a plurality of voltage responsive switching means interconnecting the other terminal of the signal voltage source with the other ends of the plurality of coils, the switching means being normally open circuited but individually responsive to the predetermined magnitudes of the signal voltage to connect the signal source to the plurality of coils to produce respective electromagnetic fields along the magnetic axes having intensities related to the magnitude of the signal voltage, the switching means being individually responsive to respective predetermined signal voltage magnitudes to close in sequence and remain closed as the signal voltage magnitude increases, the coils being arranged such that the resultant of the electromagnetic fields produced thereby is progressively displaced through an angle related to the signal voltage magnitude, and magnetic means rotatably mounted in magnetic proximity to the plurality of coils and responsive to the electromagnetic fields to be aligned with the resultant thereof, the indicator needle being connected to the magnetic means and rotatable therewith.

3. An electrical indicator for angularly displacing a magnetic armature in response to changing conditions at a remote point, the indicator comprising a plurality of deflecting coils having the magnetic axes thereof intersecting and angularly spaced to define a magnetic plane, an angular extremity of the magnetic plane being defined by the magnetic axis of one of the plurality of coils, a source of direct voltage signals having a variable magnitude indicative of the changing conditions, a plurality of switching means interconnecting the plurality of coils and the signal source, the switching means being normally open circuited but responsive to the magnitude of the signal voltage to connect the coils individually to the signal source in sequence according to progressively increasing predetermined magnitudes of signal voltage thereby producing variable electromagnetic fields along the respective magnetic axes in the magnetic plane, a bias source of constant magnitude direct voltage, switching means interconnecting the bias source and said one of the plurality of coils, the last mentioned switching means being normally conductive to connect the bias source to said one coil but responsive to the signal voltage magnitude to disconnect the bias source at a predetermined magnitude of signal voltage, the magnetic armature being rotatably mounted in magnetic proximity to the plurality of coils and responsive to the electromagnetic fields to be aligned with the resultant thereof.

4. An indicator circuit for displacing a rotatably mounted magnetic armature through an angle related to the magnitude of the signal from a variable voltage signal source, the circuit comprising first and second deflecting coils having a common first magnetic axis and adapted to produce respective electromagnetic fields in opposite directions along the first axis, third and fourth deflecting coils having a common second magnetic axis and adapted to produce respective electromagnetic fields in opposite directions along the second axis, the first and second axes intersecting at a predetermined angle, the first and third coils being connected in series across the signal source whereby the respective electromagnetic fields produced thereby are varied directly in proportion to the magnitude of the signal voltage, a source of constant magnitude bias voltage, first switching means interconnecting the bias source and the fourth coil, the first switching means being normally conductive to current from the bias source but responsive to the signal source to disconnect the bias source at a first-predetermined signal magnitude, second switching means interconnecting the second coil and the signal source, the second switching means being normally nonconductive but responsive to the signal voltage to become conductive at a second predetermined signal magnitude thereby varying the electromagnetic field produced by the second coil directly in proportion to the magnitude of the signal voltage for all magnitudes greater than the second predetermined magnitude, and third switching means interconnecting the fourth coil and the signal source, the third switching means being normally non-conductive but responsive to the signal voltage to become conductive at a third predetermined signal magnitude thereby varying the electromagnetic field produced by the fourth coil directly in proportion to the magnitude of the signal voltage for all magnitudes greater than the third predetermined magnitude, the first and third predetermined magnitudes being equal, the magnetic armature being rotatably mounted in magnetic proximity to the coils and adapted to be aligned by the resultant magnetic field 5. An indicator circuit as defined by claim 4 wherein the third switching means is interconnected with the signal source through the second switching means and the first and third predetermined magnitudes are substantially greater than the second predetermined magnitude, whereby the resultant electromagnetic field is displaced through an angle substantially greater than the predetermined angle as the voltage magnitude of the signal source is progressively varied through a range from less than the second predetermined value to greater than the first predetermined value.

6. An indicator circuit as defined by claim 5 wherein the predetermined angle is substantially 90°.

7. An electrical indicator circuit for displacing a rotatable magnetic armature through an angle indicative of conditions at a remote point, the circuit comprising a signal source for producing a direct voltage which varies in magnitude in accordance with the changing conditions, a bias source of constant magnitude direct voltage, first and second deflecting coils having a common first magnetic axis and adapted to produce respective electromagnetic fields in opposite directions along the first axis, third and fourth deflecting coils having a common second magnetic axis and adapted to produce respective electromagnetic fields in opposite directions along the second axis, the first and second axes intersecting at a predetermined angle to define a magnetic plane, the first and third coils being connected in series across the signal source, a first diode interconnecting the bias source and the fourth coil, the first diode being connected to be normally conductive to the current from the bias source, a second diode interconnecting the signal source and the second coil and being normally nonconductive to the signal voltage but having a reverse breakdown voltage equal to a first predetermined magnitude of signal voltage, third and fourth diodes series-connected to conduct in opposite directions and interconnecting the first diode and the second diode, the third diode being connected with the signal source through the second diode and normally nonconductive to the signal voltage but having a reverse breakdown voltage equal to a second predetermined magnitude of signal voltage, the second predetermined voltage being greater than the first, the fourth diode being connected to the first diode whereby a signal voltage in excess of the second predetermined voltage is applied to the first diode to render the first diode nonconductive to the bias source, the predetermined voltage value being such that the resultant of the electromagnetic fields produced by the coils is rotated through the magnetic plane as the signal voltage is varied through a range from less than the first predetermined value to greater than the second predetermined value, the magnetic armature being rotatably mounted in magnetic proximity to the magnetic plane and adapted to be aligned with the resultant field therein.

References Cited in the file of this patent
UNITED STATES PATENTS

| | | |
|---|---|---|
| 2,424,843 | Ousley | July 29, 1947 |
| 2,461,511 | Baecher | Feb. 15, 1949 |
| 2,536,805 | Hansen | Jan. 2, 1951 |